United States Patent
Petersen et al.

(10) Patent No.: US 8,264,218 B2
(45) Date of Patent: Sep. 11, 2012

(54) WING FLAP SENSOR UNIT

(75) Inventors: Benno Petersen, Herdwangen (DE); Wolfgang Kummle, Salem/Beuren (DE)

(73) Assignee: Diehl Aerospace GmbH, Uberlingen BRD (DE)

( * ) Notice: Subject to any disclaimer, the term of this patent is extended or adjusted under 35 U.S.C. 154(b) by 548 days.

(21) Appl. No.: 12/536,119

(22) Filed: Aug. 5, 2009

(65) Prior Publication Data
US 2010/0039104 A1 Feb. 18, 2010

(30) Foreign Application Priority Data
Aug. 13, 2008 (DE) .................. 10 2008 038 956

(51) Int. Cl.
*G01B 7/14* (2006.01)
*B64C 13/50* (2006.01)
(52) U.S. Cl. ............... 324/207.16; 324/207.22; 244/236
(58) Field of Classification Search ............ 324/207.16, 324/207.22; 244/236
See application file for complete search history.

(56) References Cited

U.S. PATENT DOCUMENTS
3,958,203 A * 5/1976 Bernin .................. 336/110
7,095,193 B2 * 8/2006 Kellogg et al. .......... 318/400.38

FOREIGN PATENT DOCUMENTS
| DE | 89 15 839.3 U1 | 2/1992 |
| DE | 698 16 574 T2 | 6/2004 |
| DE | 103 39 030 B4 | 11/2005 |
| DE | 103 13 728 B4 | 7/2011 |

OTHER PUBLICATIONS
DE 102008038956.0, Apr. 19, 2012 German office action.*

* cited by examiner

*Primary Examiner* — Reena Aurora
(74) *Attorney, Agent, or Firm* — Scully, Scott, Murphy & Presser, P.C.

(57) ABSTRACT

A wing flap sensor unit (2) having a position sensor (18) for detection of a rotation position of a shaft for operation of wing flaps and having a housing (4) which surrounds the position sensor (18), having an attachment component (20, 22) for attachment in an aircraft wing and having a connecting point (24) for an electrical connector of the position sensor (18). Hereby, the housing (4) is at least partially manufactured from titanium using a precision-casting method. The titanium precision-casting method makes it possible to achieve a particularly robust and lightweight housing.

9 Claims, 1 Drawing Sheet

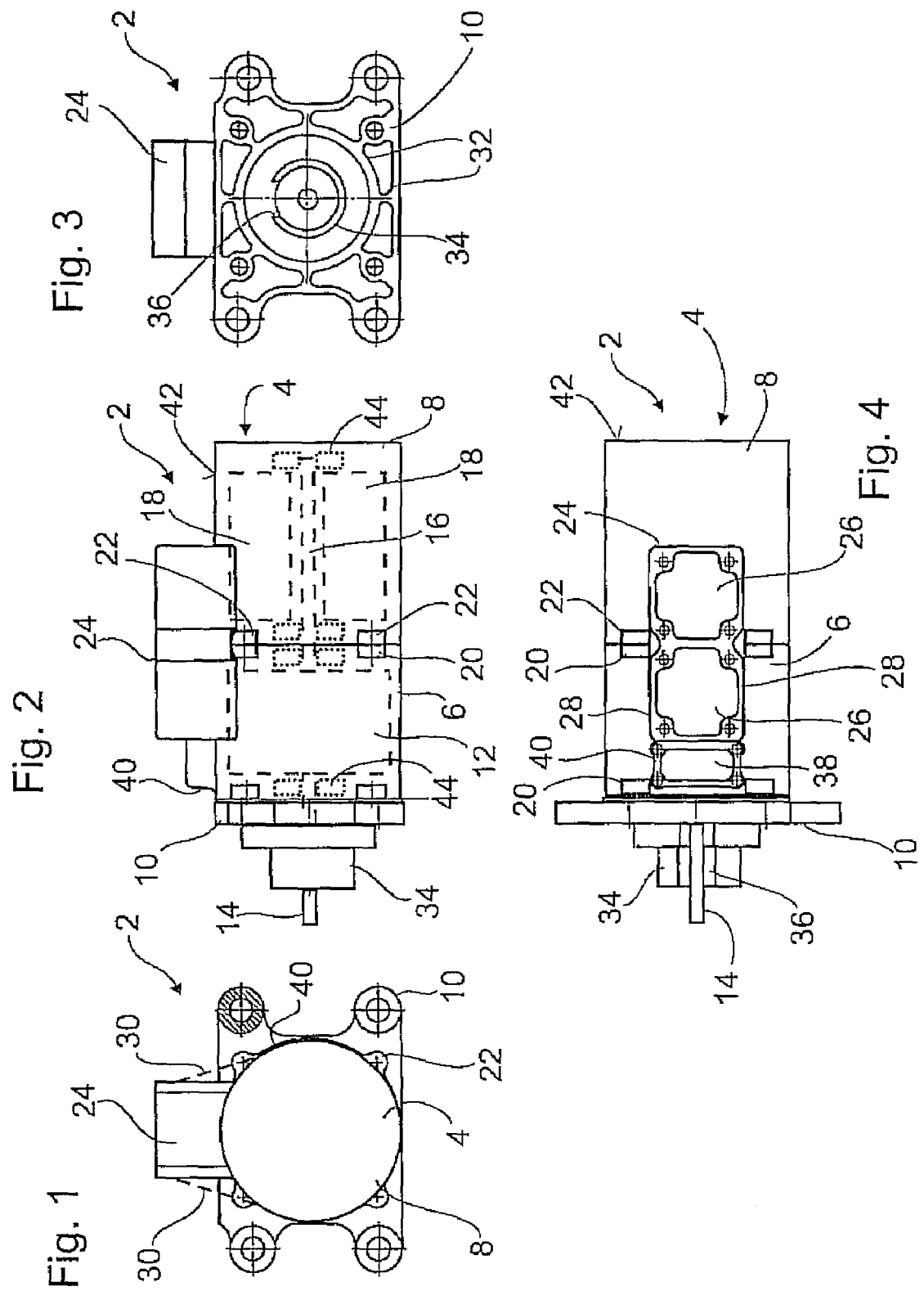

WING FLAP SENSOR UNIT

BACKGROUND OF THE INVENTION

The invention relates to a wing flap sensor unit having a position sensor for detection of a rotational position of a shaft for operation of wing flaps and having a housing which surrounds the position sensor, having an attachment means for attachment in an aircraft wing and having a connecting point for an electrical connector of the position sensor.

Relatively large aircraft, such as passenger aircraft or transport aircraft, have wing flaps and moving slats, which can be moved hydraulically in order to vary the wing profile, on their mainplanes. During a landing approach, the wing profile is set to be curved such that the lift is increased and the aircraft has sufficient lift despite the slow landing speed. There is a selection lever in the aircraft cockpit in order to control the movement of the wing flaps, via which lever the pilot sets the position of the wing flaps and slats. The input command is processed as a set position by a computer, which compares the set position with the actual position of the wing flaps and passes a control signal to a drive if there is any discrepancy between them. The drive moves ball screw spindles, which extend through the aircraft wing and completely extend or retract the wing flaps and slats, via corresponding intermediate mechanisms, by rotating several hundred times.

For reliable control of the wing flaps and slats, their current position is monitored by one or more wing flap sensors, which measure the rotational position of the ball screw spindles or of a shaft which is rigidly connected thereto. In order to achieve a reliable measurement with unambiguous settings, the revolution movement is in this case transmitted, stepped down by means of a transmission, to a position transmitter, which is moved through less than one complete revolution between an entirely retracted state and a completely extended state of one or more wing flaps or slats, as a result of which its position can clearly be associated with one flap position.

Particularly in the case of a very large aircraft, it may be necessary for the wing flaps and moving slats to be extended for a landing approach, in order to allow the aircraft to be braked reliably. If there is a defect in the movement mechanism such that wing flaps or slats cannot be moved or cannot be moved sufficiently to the predetermined position, landing may be problematic. It is therefore necessary for the wing flap sensor to reliably detect the actual position over a long time period in order to always allow control and to identify a mechanical defect early.

The wing flap sensor is arranged in the interior of an aircraft wing, is protected against external mechanical influences and comprises a housing which protects it against weather influences, water and salt, and which has interfaces, for example plugs, for electrical and signal connections.

One object of the invention is to specify a wing flap sensor which operates reliably over a long time period.

SUMMARY OF THE INVENTION

This object is achieved by a wing flap sensor of the type mentioned initially in which, according to the invention, the housing is at least partially manufactured from titanium using a precision-casting method. It is possible to manufacture a housing which is particularly robust, with thin structures which cannot be seen from the outside.

The invention is in this case based on the idea that the wing flap sensor appears to be subject to amazingly high mechanical loads despite its protected position, as is evident from defects. It could be the case that the loads occur during servicing of the individual components of the wing of an aircraft and that the servicing personnel treat the wing flap sensors very roughly and release them from their seat for removal, for example by using a rubber hammer. This behaviour is promoted per se by the normal housing which—in order to be particularly robust to withstand maltreatment—is formed with a thick housing wall, composed of aluminium in order to save weight. The thickness of the housing is perceived by the servicing personnel, the housing is considered to be robust, and is treated correspondingly roughly. Rough treatment repeatedly leads to damage to the electronics, which cannot be seen from the outside, and therefore to a reduction in the reliability of the wing flap sensor.

The invention is therefore based on the further consideration that a housing with thin structures induces a more careful behaviour by the servicing personnel who believe that the housing is somewhat fragile and carry out the servicing tasks with greater caution. However, the thinness of the housing structures must not be introduced at the expense of the robustness of the housing which is specified, for example, to be 750 $N/cm^2$. In addition, the housing must be no heavier than a previous housing since weight criteria have a very high priority in aircraft design.

It has not been possible to comply with the stringent robustness requirements by special shapes of the housing or conventional measures which keep the price of the wing flap sensor within a commercially acceptable range. Titanium also does not in its own right appear to be advantageous since - apart from the high material costs—it either does not appear to be sufficiently robust or is too heavy when designed to be appropriately thick. However, two advantages can be achieved by the use of the precision-casting method, whose interaction allows titanium to be used. These advantages result from the fact that very thin wall thicknesses of between 0.5 mm and 0.8 mm can be achieved, with very good dimensional accuracy, by means of the fine-casting method.

The high dimensional accuracy offers the first advantage, that reworking of the housing can be largely reduced despite stringent accuracy requirements, as a result of which the cast structure of the metal is not adversely affected, or is scarcely affected, by machining processes. The intact cast structure at critical points leads to sufficiently high robustness that the robustness criteria and weight criteria can be complied with in conjunction with a filigree housing structure. As a result of the intact cast structure, external structures, which are created during the casting process, remain uninterrupted, as a result of which the housing has good notched-bar strength. A force fit by outer layers of the housing can be supported without weak points being created by previous machining at an interruption of structures, which weak points could lead to crack formation.

The second advantage is that the production effort can be considerably reduced because of the small amount of effort for reworking, for example in comparison to aluminium. In conjunction with the thin wall thicknesses, by means of which the material costs can be kept within acceptable limits, the production can be simplified to such an extent that the production costs remain within a commercially acceptable range despite the fact that the material for a simple housing is intrinsically of much too high a quality.

The precision casting is expediently carried out by means of the lost-wax casting method, in which a wax model is immersed repeatedly a number of times in a binding agent and is dusted with ceramic powder until a sufficiently thick casting mould is created. This is then heated in order to melt the wax out, and is then heated further in order to sinter the casting mould. Fine structures can be filled with titanium, without any gaps being formed, with the aid of a vacuum casting technique.

The wing flap sensor is used to identify the position of the wing flaps and/or slats, although it should be noted that, in some cases, the following text does not always make particular reference to the slats, in addition to the wing flaps. The attachment means is used for attachment in an aircraft wing; rather than doing this directly, this can also be done via further elements, for example via an additional attachment flange. The attachment means and the connecting point are expediently incorporated in the housing.

The housing is manufactured at least with one housing wall composed of titanium. The entire housing is advantageously manufactured from titanium, as a result of which a sensor element is expediently surrounded by titanium all round—except for necessary or worthwhile openings in the housing. If the housing has an attachment flange composed of titanium, then fine structures can also be supported on the outside on the flange, as a result of which careful handling is visually advisable.

The housing is expediently produced at least largely without any machining. In particular, at least the majority of its outer surface is provided without any such machining and, in particular, has its cast skin. An area for fitting a nameplate can also be produced in the casting itself to be so smooth that there is no need for reworking. The entire outer surface is expediently in this form.

Bearing points and connections can also be produced in the fine casting process itself sufficiently finely that there is no need for machining. For example, a connecting point for an electrical connector can be cast such that it is a finished product at this stage, in the same way as an attachment means for attachment to a supporting element in the aircraft wing. In order to allow the position of the shaft to be read from the outside, the housing can be provided with a recess, which is closed by a transparent window. The housing interface to a sight glass such as this can remain unmachined to a null position mark, as a result of which the structure of sensitive edge structures in fact remains intact and robust.

Points which need to be manufactured with particularly exact dimensions, for example a shaft bearing seat or a transmission holder, may still need reworking despite the accurate precision casting method. However, as a result of the high dimensional accuracy of the fine casting, it may be sufficient to grind such interfaces, thus making it possible to dispense with machining in this case as well, with only a minimal adverse effect on the external structure of the housing.

The use of a wing flap sensor unit housing produced using the titanium precision casting method in an aircraft wing allows a wide range of shapes for the housing since, despite the stringently specified, confined physical space in the wing, the thin walls provide free spaces which would be filled by a thicker housing if an aluminium design were used. The invention therefore allows new advantageous shapes of the housing, some options for which will be described in the following text.

In one advantageous embodiment of the invention, the housing has a first housing part, which surrounds the position sensor, and a second housing part, which surrounds a transmission, with both housing parts being designed with an identical attachment means, for example for attachment to an attachment flange. Despite the position sensor and the transmission having different dimensions, it is possible to make use of the same attachment means, such that the wing flap sensor unit can be attached, for example, to one and the same flange with or without a transmission.

The connecting point is advantageously arranged on the second housing part. This housing part, which conceals the transmission, is arranged in the vicinity of an attachment to the wing, for example a flange, that is to say where the first housing part would be if the wing flap sensor unit had no transmission. This makes it possible to always fit an aircraft-side connector at the same point, irrespective of whether a wing flap sensor unit with or without a transmission is used.

A housing shape and arrangement of connectors on the housing which is particularly robust with respect to impact, for example of a rubber hammer, can be achieved if the connecting point is designed for an electrical connector which is aligned in the radial direction with respect to a shaft of the position sensor.

Damage caused, for example, by being struck by a hammer can be counteracted if the connecting point is connected to a cylindrical housing part via housing inclined surfaces. With this embodiment, the high level of robustness of the housing makes it possible to dispense with a housing shape which is cylindrical all round, around the position sensor or the transmission.

BRIEF DESCRIPTION OF THE DRAWINGS

Further advantages will become evident from the following drawing description. Exemplary embodiments of the invention are illustrated in the drawing. The drawing and the description contain numerous features in combination, which a person skilled in the art will expediently also consider individually and will combine to form worthwhile further combinations.

In the figures:

FIG. 1 shows a wing flap sensor unit from the rear,

FIG. 2 shows an illustration, from the side, of the wing flap sensor unit from FIG. 1, FIG. 3 shows the wing flap sensor unit from FIG. 1 from the front, and FIG. 4 shows the wing flap sensor unit from FIG. 1 from above.

DETAILED DESCRIPTION OF THE INVENTION

FIGS. 1 to 4 show four different views of a wing flap sensor unit 2, specifically—in the sequence of the figures—from the rear, from the side, from the front and from above. The wing flap sensor unit 2 is provided with a housing 4 as an outer casing, which has a front part 6 and a rear part 8. The front part 6 is connected to an attachment flange 10 for attachment in an aircraft wing and, in its interior, conceals a transmission 12, which is indicated by dashed lines in FIG. 2. The transmission 12 is provided to step down rapid rotation of a shaft 14, which is connected to a ball screw spindle in the interior of the aircraft wing, to a slow rotation of a shaft 16, which is monitored by two position sensors 18 in the rear part 8 of the housing 4. The transmission 12 is designed such that the rear shaft 16 rotates through less than one complete revolution during a complete extension movement of a slat or of a wing flap, such that its absolute position with respect to the position sensors 18 provides a clear conclusion on the position of the slat or of the wing flap.

Both the housing 4 and the attachment flange 10 are manufactured completely from titanium. The two surrounding parts 6, 8 of the housing 4 in this case predominantly have wall thicknesses of between 0.5 mm and 0.8 mm, with areas around attachment means 20, 22 and the attachment means 20, 22 themselves being made somewhat thicker. The rear part 8 of the housing 4 surrounds the two position sensors 18 in the form of a pot on five sides, with the side wall being placed cylindrically around the position sensors 18. The rear part 8 is open to the front part 6, and the two parts 6, 8 are firmly connected to one another by screw connections, by means of their attachment means 20, 22. The front part 6 of the housing 4 is essentially tubular and is connected firmly to the attachment flange 10 by screw connections, by means of its four attachment means 20.

A connecting point 24 for two electrical connectors of the position sensors 18 is provided on the upper face of the housing 4 and is formed integrally with the front part 6 of the housing 4. The connecting point has two openings 26 for insertion of a connector or plug in each case, the mating pieces of which are already positioned in the openings 26 when the wing flap sensor unit 2 is in the ready-to-operate state, for connecting to the inserted plugs.

The connecting point 24 is produced with two parallel side walls 28, both of which are parallel to the insertion direction from top to bottom, that is to say parallel to the viewing direction in FIG. 4. In one alternative embodiment of the connecting point 24, the side walls 28 may be formed obliquely with respect to one another as housing inclined surfaces 30, as is indicated by dashed lines in FIG. 1. This makes it possible to ensure that a corresponding connecting point is very highly robust, and is even very robust against hammer blows.

The connecting point 24 is produced integrally with the front part 6 of the housing 4. In one alternative embodiment, an analogous connecting point 24 may be manufactured, for example, integrally with the rear part 8 of the housing 4, thus allowing the rear part 8 to be connected directly to the attachment flange 10, without the front part 4. This is particularly advantageous for a wing flap sensor unit 2 which has no transmission 12 and whose shaft 16 can be rigidly connected to the incoming shaft 14 at the position sensors 18. In this way, the connecting point 24 remains independent of the embodiment of the wing flap sensor unit 2 relative to the attachment flange 10 and thus always remains at the same position relatively in the aircraft wing, thus allowing an attachment within the aircraft wing to be matched to a wing flap sensor unit 2 with or without a transmission 12. The identical configuration of the attachment means 20, 22 allows both the attachment means 22 and the attachment means 20 to be directly connected to the attachment flange 10, as is illustrated in FIG. 2.

The attachment flange 10 is provided with a skeleton structure 32, which makes it particularly strong, at the same time being formed by thin walls of lightweight construction. A cutout 36 is incorporated in an upper area of a shaft enclosure 34, in order to allow the shaft 14 to be seen from the outside. A position marking on the shaft 14 can be seen through this, thus making it possible to visually check a null-point position. A further cutout 38 is provided behind the attachment flange 10 and is surrounded by a wall 40 in the form of a box for a sight glass to be screwed on, as a result of which it is also possible to see a null-point marking on the transmission 12. The cast skin is intact in both areas of the cutouts 36, 38.

The housing 4 is produced without any machining over the entire outer surface 42, both on its front part 6 and on its rear part. The cast skin from the precision-casting method which was used to produce the housing 4 is retained in particular over the entire outer surface 42. The area outside and inside the connecting point 24 is also produced without any reworking of the solidified titanium. Despite increased material costs in comparison to aluminium this allows the housing 4 to be produced at low cost. Shaft bearing seats 44, which are indicated by dashed lines in FIG. 2, are located in the interior of the housing 4. These are also produced by the precision-casting method itself sufficiently exactly that they require no subsequent machining, and their exact dimensions are set simply by grinding. A transmission holder and a sensor holder, which are not shown in the schematic illustration in FIG. 2 within the front part 6 and the rear part 8 of the housing 41 are produced without any machining, and their precise dimensions are produced, if necessary, simply by grinding. As a result of the largely intact cast skin of the housing 4, this housing 4 has a high notched-bar strength, particularly on the outsider as a result of which the housing 4 is very strong despite having a very thin housing wall.

LIST OF REFERENCE SYMBOLS

2 Wing flap sensor unit
4 Housing
6 Part
8 Part
10 Attachment flange
12 Transmission
14 Shaft
16 Shaft
18 Position sensor
20 Interface
22 Interface
24 Connecting point
26 Opening
28 Side wall
30 Housing inclined surface
32 Skeleton structure
34 Shaft enclosure
36 Cutout
38 Cutout
40 Wall
42 Outer surface
44 Shaft bearing seat

What is claimed is:

1. A wing flap sensor unit having a position sensor for detection of a rotational position of a shaft for operation of wing flaps, including:
   a housing which surrounds the position sensor, and
   an attachment means for attachment in an aircraft wing and providing a connecting point for an electrical connector of the position sensor,
   wherein the housing is at least partially manufactured from titanium by a precision-casting method.

2. The wing flap sensor unit according to claim 1, wherein the housing is composed entirely of titanium.

3. The wing flap sensor unit according to claim 1, wherein the housing comprises an attachment flange that is composed of titanium.

4. The wing flap sensor unit according to claim 1, wherein the housing is manufactured on the outer surface thereof, in the area of the titanium, in the absence of any machining.

5. The wing flap sensor unit according to claim 1, wherein a shaft bearing seat, which is manufactured without any machining, is formed into the housing.

6. The wing flap sensor unit according to claim 1, wherein the housing has a first housing part which surrounds the position sensor, and a second housing part which surrounds a transmission, said housing parts each comprising an identical attachment means for attachment in the aircraft wing.

7. The wing flap sensor unit according to claim 6, wherein the connecting point is arranged on the second housing part.

8. The wing flap sensor unit according to claim 1, wherein the connecting point is designed for an electrical connector which is aligned in a radial direction with respect to a shaft of the position sensor.

9. The wing flap sensor unit according to claim 1, wherein the connecting point is connected to a partially cylindrical housing part via inclined housing surfaces.

* * * * *